United States Patent [19]

Fyfe

[11] Patent Number: 5,655,982
[45] Date of Patent: Aug. 12, 1997

[54] HYDRAULIC SHIFTING SYSTEM FOR RIDER PROPELLED VEHICLE

[76] Inventor: Scott A. Fyfe, 703 Highland Pl., San Dimas, Calif. 91773

[21] Appl. No.: 491,042

[22] Filed: Jun. 16, 1995

[51] Int. Cl.⁶ ........................................ F16H 9/24
[52] U.S. Cl. .................. 474/80; 474/110; 280/238; 280/261
[58] Field of Search ................ 474/70, 80, 101, 474/104, 110; 280/200, 201, 236, 238, 261

[56] References Cited

U.S. PATENT DOCUMENTS

| | | | |
|---|---|---|---|
| 3,742,777 | 7/1973 | Mathauser | 474/82 X |
| 3,899,057 | 8/1975 | Carre | 188/351 |
| 3,944,253 | 3/1976 | Ripley | 280/238 |
| 4,061,046 | 12/1977 | Lang | 474/80 X |
| 4,164,153 | 8/1979 | Moritsch et al. | 474/70 |
| 4,201,094 | 5/1980 | Rathmell | 474/70 |
| 4,571,219 | 2/1986 | Breden et al. | 474/70 |
| 4,618,331 | 10/1986 | Deal | 474/49 |
| 4,836,046 | 6/1989 | Chappel | 474/56 X |
| 4,938,324 | 7/1990 | Van Dyke | 188/317 |
| 5,102,372 | 4/1992 | Patterson et al. | 474/80 |
| 5,197,927 | 3/1993 | Patterson et al. | 474/80 |

Primary Examiner—Roger J. Schoeppel
Attorney, Agent, or Firm—Boniard I. Brown

[57] ABSTRACT

A shiftable variable ratio sprocket chain drive for rider propelled vehicles, such as bicycles, and for other uses has a shifting mechanism, such as a derailleur mechanism or a gear mechanism, a shifting actuator operable by the rider or user, and a novel hydraulic connector operatively connecting the actuator and the shifting mechanism for hydraulically operating the shifting mechanism to vary the ratio of the drive in response to operation of the actuator.

9 Claims, 6 Drawing Sheets

HYDRAULIC SHIFTING SYSTEM FOR RIDER PROPELLED VEHICLE

BACKGROUND OF THE INVENTION

1. Field of the Invention

This invention relates generally to shiftable variable ratio sprocket chain drives of the kind having an adjustable shifting mechanism operable by a shifting actuator for varying the drive ratio of the drive. The invention relates more particularly to an improved sprocket chain drive of this kind embodying a novel hydraulic shifting system and to a rider propelled vehicle, such as a bicycle, embodying the improved chain drive. The invention relates also to a novel hydraulic connector for such chain drives.

2. Discussion of the Prior Art

Shiftable variable ratio sprocket chain drives of the kind to which this invention relates are most commonly used on bicycles, such as racing bicycles and so-called mountain bikes. The present invention is intended primarily for use on such bicycles and will be described in this context. It will become readily evident as the description proceeds, however, that the invention may be used on other rider propelled vehicles and other devices having a shiftable variable ratio sprocket chain drive of the character described.

A conventional variable speed bicycle of the kind referred to above has a frame, a rear drive wheel and a front steerable wheel, a seat for the rider, a handle bar for steering the front wheel, a rotary crank mounting pedals to be engaged by the rider's feet for rotating the crank with pedaling action, and a shiftable variable ratio sprocket chain drive connecting the crank and the rear wheel. Rotation of the crank in one direction drives the rear wheel in a direction to propel the bicycle forwardly. The crank may or may not freewheel relative to the rear wheel in the opposite direction of crank rotation.

There are at present two different basic types of such sprocket chain drives. While these two types of drives differ in their construction and operation, they share the common features of a shifting actuator mounted on the bicycle in a position conveniently accessible to the bicycle rider and commonly on the handle bar, and a mechanical cable connecting the actuator to the shifting mechanism of the transmission in such manner that adjustment of the actuator by the rider operates the shifting mechanism to vary the drive ratio of the transmission.

The most common type of shiftable, variable ratio sprocket chain drive for bicycles embodies a so-called derailleur shifting mechanism which is operable to adjust the drive ratio of the sprocket chain drive. In this disclosure, "drive ratio" is defined as the number of revolutions of the pedal crank per revolution of the rear wheel. This type of bicycle sprocket chain drive includes front sprocket means associated with the bicycle pedal crank, rear sprocket means associated with the rear bicycle wheel, and a sprocket chain trained about and in driving engagement with the front and rear sprocket means. The front sprocket means is drivably coupled to the pedal crank for rotation of the front sprocket means by the crank. The rear sprocket means is drivably coupled to the rear bicycle wheel for rotation of the rear wheel in a forward direction (i.e. in a direction to propel the bicycle forwardly) by rotation of the rear sprocket means in a forward direction. The rear sprocket means may freewheel in the opposite direction relative to the rear wheel.

At least one sprocket means of the sprocket chain drive comprises a cluster of coaxial chain sprockets of progressively differing diameters. The several sprockets of each cluster are drivably joined for rotation in unison. Associated with each sprocket cluster is a derailleur shifting mechanism including a shifting member which is adjustable axially of the cluster to shift the adjacent portion of the sprocket chain from one cluster sprocket to the next in one axial direction of the cluster to increase the drive ratio and in the opposite axial direction of the cluster to decrease the drive ratio. The shifting member is urged on one of these directions by a derailleur spring.

The derailleur mechanism includes an idler tension sprocket or pulley about which the chain passes and which is spring biassed in a direction to take up excess slack created in the sprocket chain during shifting of the chain from a larger sprocket to a smaller sprocket. This tension sprocket yields in the opposite direction to provide chain slack during shifting of the chain from a smaller sprocket to a larger sprocket and acts to continuously maintain a proper chain tension in all positions of the derailleur shifting mechanism.

A conventional bicycle with either or both front and rear derailleur shifting mechanisms has a separate shifting actuator for operating each derailleur mechanism. Each shifting actuator is connected by a wire cable to the adjustable shifting member of the respective shifting mechanism and includes actuator means (either a single actuator member or a pair of actuator members) operable by the bicycle rider. Each actuation of a shifting actuator involves adjustment or movement of its actuating means which operates the corresponding derailleur mechanism through the corresponding wire cable to shift the adjacent portion of the sprocket chain from one sprocket to the next sprocket of the respective sprocket cluster to increase or decrease, as the case may be, the drive ratio of the sprocket chain drive. A single derailleur shifting mechanism provides a certain range of drive ratios. The two derailleur mechanisms of a bicycle having both front and rear derailleur mechanisms are selectively adjustable individually and in combination to provide a much wider range of drive ratios. Examples of bicycles having such derailleur shifting mechanisms are described in U.S. Pat. No. 4,938,324, dated Jul. 3, 1990 to Van Dyke and U.S. Pat. No. 5,102,372, dated Apr. 7, 1992 to Patterson et al. U.S. Pat. No. 3,899,057 to Carre describes a hydraulic brake system for a bicycle.

Another type of shiftable variable ratio sprocket chain drive for bicycles utilizes a rear wheel shifting mechanism commonly referred to as an internal gear shifting mechanism. This type of sprocket chain drive comprises a single sprocket rigid on the bicycle pedal crank, a single sprocket coupled to the rear bicycle wheel through the gear shifting mechanism, and a sprocket chain trained about these sprockets. The gear shifting mechanism comprises a shiftable gear train which is contained within the central hub of the rear wheel and drivably couples the rear sprocket to the rear wheel. This gear train includes an adjustable shifting member operatively connected to a shifter chain which extends externally of the hub through an axial bore in the rear wheel axle. This shifting member is adjustable in one direction to increase and in the opposite direction to decrease the gear ratio or drive ratio of the mechanism (i.e. the number of rear wheel revolutions per pedal crank revolution). Pulling the outer end of the shifter chain moves the shifting member in one of these directions against the force of a spring embodied in the shifting mechanism.

A bicycle equipped with such a gear shifting mechanism has a shifting actuator which may be similar to that used with a derailleur shifting mechanism. This shifting actuator is mounted on the bicycle in a position easily accessible to the bicycle rider, such as on the bicycle handlebar, and is operatively connected by a wire cable to the shifter chain of the internal gear shifting mechanism. This shifting actuator is operable by the rider to pull on or release the shifter chain in increments in such manner as to step the shifting mechanism through its range of drive ratios.

The existing shiftable variable ratio bicycle sprocket chain drives of the kind discussed above have certain deficiencies which are cured by this invention. These deficiencies result from the fact that each rider-operated shifting actuator of the sprocket chain drives is connected to the adjustable shifting member of the respective shifting mechanism by a wire cable connector comprising a wire cable which extends slidably through cable guides and protective tubes or sheaths secured to the bicycle frame. Operation of the shifting actuator in one direction pulls the cable endwise in stepwise increments against the opposing force of the spring embodied in the shifting mechanism to move the adjustable shifting member of the shifting mechanism stepwise in one direction through its different drive ratio positions. Operation of the shift actuator in the opposite direction releases the cable in increments for stepwise return of the shifting member in the opposite direction through its different drive ratio positions by spring action.

These existing wire cable-actuated shifting systems for variable ratio sprocket chain drives have certain undesirable characteristics which adversely affect the shifting action of the chain drives. Among the foremost of these undesirable characteristics are the following. Dirt and grit tend to accumulate in and thereby resist free endwise sliding movement of the shift cable through the cable guides and sheaths. This resistance interferes with proper shifting action of the chain drives. Further, the wire cables of the cable connectors are quite long and tend to stretch over a period of time. This cable stretch introduces a certain sponginess into the shifting action which greatly interferes with or prevents proper shifting from one drive ratio to another. Moreover, wire cable shifting systems require frequent adjustment to compensate for such cable stretching. Even disregarding the adverse consequence of such cable stretching, the relatively long lengths of the wire cable connectors, particularly the rear wheel connector, introduces a certain play or lost motion into the shifting action which interferes with proper shifting of the chain drives from one drive ratio to another. Accordingly, there is a definite need for an improved shiftable, variable ratio sprocket chain drive of the character described.

BRIEF DESCRIPTION OF THE INVENTION

This invention provides such an improved shiftable, variable ratio sprocket chain drive. The improved drive is intended primarily for use on bicycles and will be described in this context. However, it will become evident as the description proceeds that the improved sprocket chain drive may be used on other types of rider propelled vehicles and for other purposes than driving rider propelled vehicles.

Simply stated, this invention provides an improved shiftable variable ratio sprocket chain drive comprising a shifting mechanism, and hydraulic shifting means connected to the shifting mechanism for shifting the mechanism to vary the drive ratio of the chain drive. The shifting mechanism includes an adjustable shifting member, and the hydraulic shifting means comprises a shifting actuator and a novel hydraulic connector according to the invention connecting the shifting actuator and the shifting member in a manner such that operation of the shifting actuator adjusts the shifting member hydraulically through the hydraulic connector.

The hydraulic connector comprises a pair of hydraulic units, referred to herein as an input unit and an output unit, respectively, each containing a hydraulic chamber, and an hydraulic tube or hose connecting the hydraulic chambers of the two units for hydraulic fluid flow between the chambers. The hydraulic input unit of the hydraulic connector includes an input member and the hydraulic output unit of the hydraulic connector includes an output member. Each of these members is movable in one direction to displace hydraulic fluid from a hydraulic chamber of the respective unit to a hydraulic chamber in the other unit and in the opposite direction by hydraulic fluid entering the respective chamber.

The input member of the hydraulic input unit of the present hydraulic connector is connected to the shifting actuator of the sprocket chain drive to be controlled. The output member of the hydraulic output unit is connected to the adjustable shifting mechanism of the chain drive, and more specifically to the adjustable shifting member of the shifting mechanism, in such a way that the output member and the shifting member are urged in one direction by hydraulic fluid pressure in the connector and in the opposite direction by a spring in the shifting mechanism. The hydraulic connector is connected between the user operated shifting actuator and the chain drive shifting mechanism in such manner that adjustment of the shifting actuator moves the input member of the connector input unit in one direction or the other. This movement of the input member of the hydraulic connector effects corresponding movement of the output member of the hydraulic connector and thereby of the adjustable shifting member of the shifting mechanism by the combined action of hydraulic pressure in the connector and the opposing spring force in the shifting mechanism to effect stepping of the adjustable shifting member in one direction or the other through its variable ratio positions.

This invention is primarily designed for use on a multi-speed bicycle and is described herein in connection with bicycle having derailleur shifting mechanisms and a bicycle having a gear shifting mechanism. In this use, each cable connector on the bicycle is replaced by a hydraulic connector according to this invention. To this end, the hydraulic input unit of each hydraulic connector is mounted on the bicycle adjacent an existing rider-operated shifting actuator on the bicycle. The input member of the connector hydraulic input unit is connected to the adjacent shifting actuator, preferably by a short length of metal cable. Similarly, the hydraulic output unit of each hydraulic connector is mounted on the bicycle closely adjacent the respective adjustable shifting mechanism of the sprocket chain drive. The movable output member of the connector hydraulic output unit is connected to the adjacent shifting mechanism, preferably by another short length of metal cable.

Each shifting actuator and its hydraulic connector together form an hydraulic shifting means for the shifting mechanism of the sprocket chain drive. This shifting means and the corresponding shifting mechanism of the sprocket chain drive form a hydraulic shifting system for adjusting the drive ratio of the sprocket chain drive. Because this hydraulic shifting system utilizes non-compressible hydraulic fluid rather than long stretchable wire cables to operatively connect each shifting actuator to its shifting mechanism and requires no cable guides and sheaths, the hydraulic shifting system and sprocket chain drive embodying same are not subject to the earlier stated disadvantages of the existing wire cable connectors and sprocket chain drives embodying such cable connectors.

According to another aspect of this invention, the hydraulic input unit and the hydraulic output unit of the hydraulic connector are uniquely constructed an arranged to permit the connector to be easily retrofitted on a bicycle or other sprocket chain driven device as a replacement for the conventional cable connector(s). Moreover, as noted earlier, the invention may be utilized on other rider propelled vehicles than bicycles and, in fact, in sprocket chain drives on other than rider propelled vehicles. In this regard, it will be understood that sprocket chain drive of a bicycle or other rider propelled vehicle is essentially a rotary torque transmission in which the pedal crank is a rotary driving member. The driven wheel is a rotary driven member, and the sprocket chain transmits rotary driving torque from the driving member to the driven member for driving the driven member in rotation upon rotation of the driving member.

DESCRIPTION OF THE PREFERRED EMBODIMENTS

Turning now to these drawings and first to FIGS. 1-12, there is illustrated a device 10 having an improved hydraulically shiftable variable ratio sprocket chain drive 12 according to the invention. The particular device illustrated is a rider propelled vehicular device, specifically a multi-speed bicycle which constitutes the primary intended use of the invention. As noted earlier, however, and will become readily evident as the description proceeds, the invention may be used on other types of devices and especially on other types of rider propelled vehicles.

Except for the improved hydraulically shiftable sprocket chain drive 12, the vehicular device or bicycle 10 is conventional and, in this case, substantially identical to the bicycle illustrated and described in the earlier mentioned U.S. Pat. No. 5,102,372. For this reason, it is necessary to describe the bicycle only in sufficient detail to provide a clear and complete understanding of this invention. With this in mind, the bicycle 10 has a frame 14 supported on a front steering wheel 16 and rear driven wheel 18, a seat 20, and a pedal crank 22 rotatably mounted on the frame and including pedals 24 engagable by the rider's feet. The sprocket chain drive 12 drivably connects the pedal crank 22 to the rear wheel 18 in such manner that rotation of the crank in the clockwise direction in FIG. 1 by the rider drives the rear wheel in a direction to propel the bicycle forwardly. Frame 14 comprises a front frame fork 26 and a main frame portion including a head tube 27 and a rear fork 28 rigidly joined by frame members 30, 32, 34, 36. The front fork 26 straddles and rotatably supports the front wheel 16 and is journalled in the head tube 27. A handlebar 38 is fixed to the upper end of the front fork for steering the bicycle. The rear fork 28 straddles and rotatably supports the rear wheel 18.

The sprocket chain drive 12 comprises front sprocket means 40 rigidly coaxially mounted on the pedal crank 22 for rotation with the crank, rear sprocket means 42, and a sprocket chain 43 trained about and in driving engagement with the front and rear sprocket means, whereby rotation of the crank rotates the drives the rear sprocket means in rotation. The rear sprocket means 42 is connected to the rear wheel 18 by a one way drive mechanism (not shown), whereby rotation of the rear sprocket means in the clockwise direction in FIGS. 1 drives the rear wheel in a direction to propel the bicycle forwardly. The rear sprocket means freewheels relative to the rear wheel in the opposite direction of rotation. It is evident at this point that sprocket chain drive 12 is essentially a rotary torque transmission device in which the pedal crank 22 is a rotary driving member, the rear wheel 18 is a rotary driven member, and the sprocket chain 43 transmits rotary driving torque from the driving member to the driven member for driving the driven member in rotation upon rotation of the driving member.

The sprocket chain drive 12 is a shiftable variable ratio drive comprising a rear shifting mechanism 44 including adjustable shiftable means 46 and a front shifting mechanism 48 including adjustable shiftable means 50. These two shiftable means are adjustable individually and in combination to vary the drive ratio of the chain drive. In this disclosure, the drive ratio is defined as the number of revolutions of the pedal crank 22 per revolution of the rear wheel 18. Mounted on the handle bar 38 are a pair of shifting actuators 52, 54 for operating the shifting mechanisms 44, 48, respectively. These shifting actuators are connected to their respective shifting mechanism by hydraulic connectors 56, 58 according to this invention in such manner that actuation of each shifting actuator operates the corresponding shifting mechanism to vary the drive ratio of the sprocket chain drive 12. Each shifting actuator 52, 54 and its hydraulic connector 56, 58 forms a rider operated hydraulic shifting means for shifting the corresponding shifting mechanism 44, 48. These hydraulic shifting means and the corresponding shifting mechanisms together form rear and front hydraulic shifting systems 59a, 59b.

Except for the shifting actuators 52, 54 and the hydraulic connectors 56, 58, the shiftable sprocket chain drive 12 described to this point is substantially identical to that described in U.S. Pat. No. 5,197,927. The shifting actuators 52, 54 differ from those of the latter patent but are conventional bicycle shifting actuators never-the-less. The hydraulic connectors 56, 58 constitute a major improvement feature of this invention. These hydraulic connectors effect actuation of the chain drive shifting mechanisms 44, 50 in response to operation of the shifting actuators 52, 54 by hydraulic action rather than by mechanical pulling action as do conventional wire cable connectors and are not subject to the earlier mentioned disadvantages of wire cable connectors.

Referring now in more detail to FIGS. 1–12, the illustrated shiftable variable ratio sprocket chain drive 12 is derailleur shifting drive which is identical to that described in U.S. Pat. No. 5,197,927 except for the hydraulic connectors 56, 58 of this invention. Front sprocket means 40 of the drive comprises a cluster of coaxial sprockets 60, in this instance two sprockets, of different diameters rigid on and coaxial with the pedal crank 22. Rear sprocket means 42 of the drive comprises e cluster of coaxial sprockets 62, in this instance five sprockets, of progressively differing diameters. Sprockets 62 are rigidly joined to one another and coupled to the rear wheel 18 in the manner explained earlier.

Figures 1, 2, 3:
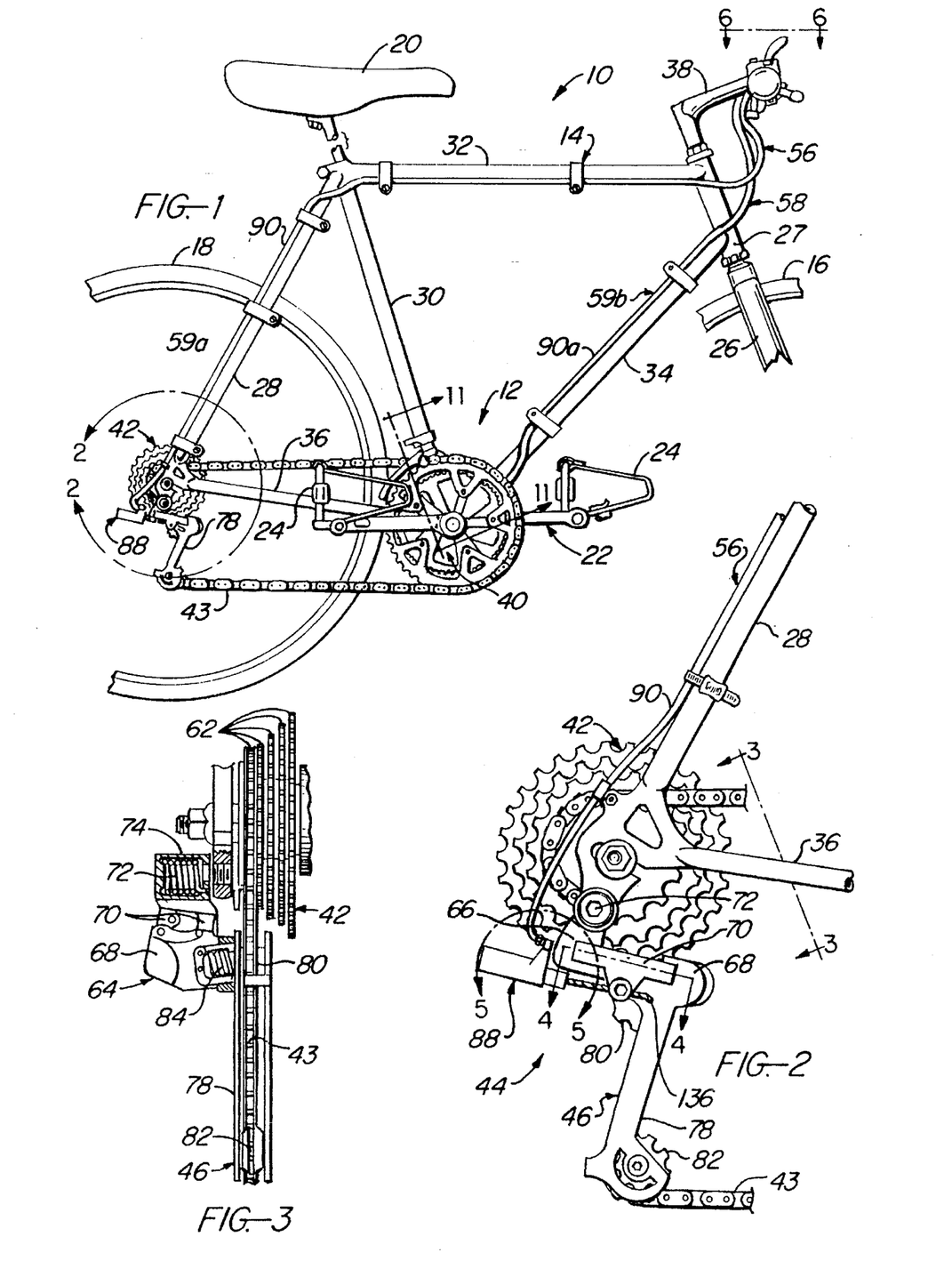
FIG. 1 is a fragmentary side elevation of a device, in this case a rider propelled vehicle and more specifically a bicycle, having a shiftable variable ratio sprocket chain drive including an hydraulically actuated derailleur shifting system according to this invention.
FIG. 2 is an enlargement of the area encircled by the arrow 2—2 in FIG. 1.
FIG. 3 is a view looking in the direction of the arrows on line 3—3 in FIG. 2.

Shifting mechanisms 44, 48 of the sprocket chain drive 12 comprise derailleur mechanisms. Referring to FIGS. 2–5, the rear derailleur shifting mechanism 44 comprises a parallelogram support 64 including a rear support arm 66 having normally upper and lower ends, a forward body 68, and a pair of parallel arms 70 pivotally attached at their rear ends to the lower end of the support arm and at their front ends to the body. The upper end of the support arm 66 is pivotally attached by a bolt 72 to the lower end of the rear fork arm 28 at the outer side of the rear sprocket cluster 42 for pivoting of the parallelogram support 64 on a pivot axis parallel to the axis of the rear sprocket cluster 42. The parallelogram support 64 is urged clockwise in FIG. 2 about the bolt 72 by a spring 74 (FIG. 3) about the bolt. The parallel arms 70 support the parallelogram body 68 on the parallelogram support arm 66 for movement axially of the rear sprocket cluster 42 toward and away from the rear wheel 18. A derailleur spring 76 (FIG. 4) in the parallelogram support urges the parallelogram body 68 outwardly away from the rear wheel. Pivotally mounted at one end on the parallelogram body 68 on an axis substantially parallel to the axis of the rear sprocket cluster 42 and depending below the body is a sprocket support arm or cage 78. Rotatably mounted on this cage on axes substantially parallel to the cage pivot axis are a shifting sprocket 80 directly adjacent the rear sprocket cluster 42 and a tension sprocket 82 at the lower end of the cage. The sprocket chain 43 extends about the sprocket clusters 40, 42, the shifting sprocket 80, and the tension sprocket 82 in the manner shown in FIGS. 1 and 2. The sprocket cage 78 is urged clockwise in FIG. 2 relative to the parallelogram support 64 by a spring 84 (FIG. 3).

The rear derailleur mechanism 44 as described to this point is substantially identical to that of U.S. Pat. No. 5,197,927. The parallelogram support 64 and sprocket cage 78 of the derailleur mechanism constitute the earlier mentioned adjustable shiftable means 46 of the rear derailleur mechanism. As described more fully in the patent, the rear derailleur mechanism 44 is operable in downshifting and upshifting modes. In the downshifting mode, the derailleur shiftable means 46 is adjusted outwardly away from the rear wheel 18 in stepwise fashion by the force of the derailleur spring 76 to shift the sprocket chain 43 outwardly along the rear sprocket cluster 42 stepwise from the largest sprocket to the smallest sprocket of the rear cluster. In the upshifting mode, the derailleur shiftable means 46 is adjusted inwardly toward the rear wheel in stepwise fashion against the bias of the derailleur spring 76 to shift the sprocket chain 43 inwardly along the rear sprocket cluster stepwise from the smallest sprocket to the largest sprocket of the rear cluster.

As mentioned earlier, a major improvement feature of this invention resides in the hydraulic connectors 56, 58. These connectors are essentially identical so that a description of one will suffice for both. Hydraulic connector 56 is described below using certain reference numerals. In the later discussion, these same reference numerals, with the subscript a, are used to designate the corresponding elements of hydraulic connector 58 which are visible in the drawings. Those elements of the hydraulic connector 58 which are not visible in the drawings are designated by the same reference numerals with the subscript a, both in parenthesis, as their corresponding elements in the hydraulic connector 56.

Hydraulic connector 56 connects the shifting actuator 52 to the rear derailleur mechanism 44 to operate the rear derailleur mechanism by hydraulic action in response to operation of the shifting actuator. This hydraulic connector comprises a pair of identical hydraulic units 86, 88 joined by an hydraulic tube or hose 90. Hydraulic unit 86 is referred to herein as a hydraulic input unit or simply an input unit. Hydraulic unit 88 is referred to herein as a hydraulic output unit or simply an output unit.

Figure 8:
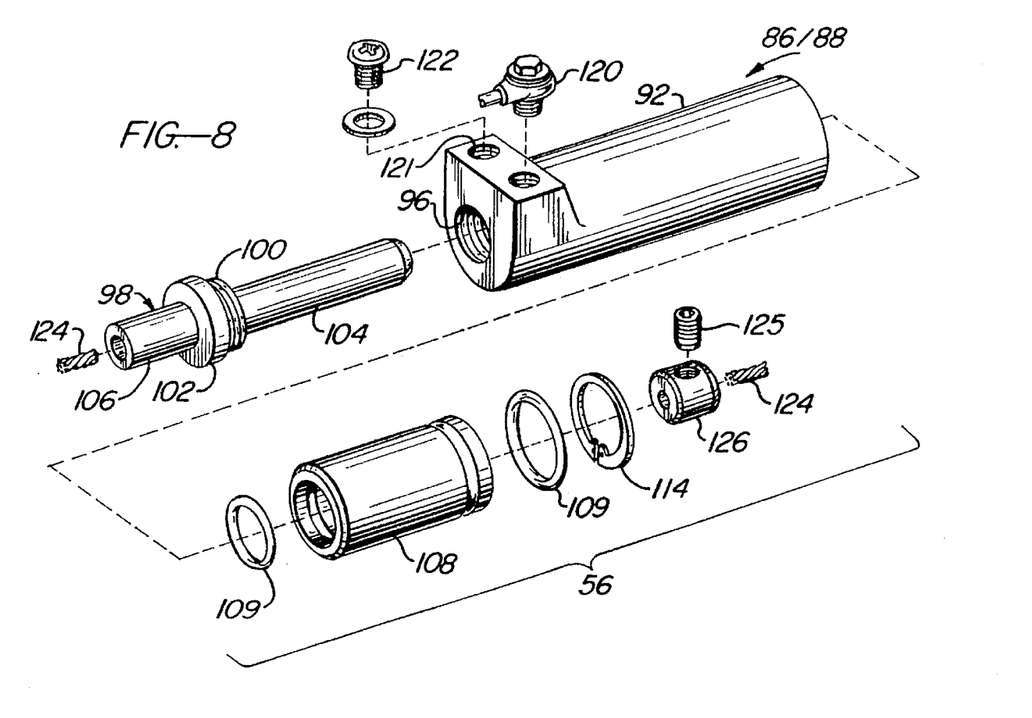
FIG. 8 is an exploded perspective view of one hydraulic unit of the hydraulic connector of this invention.
Figure 9:
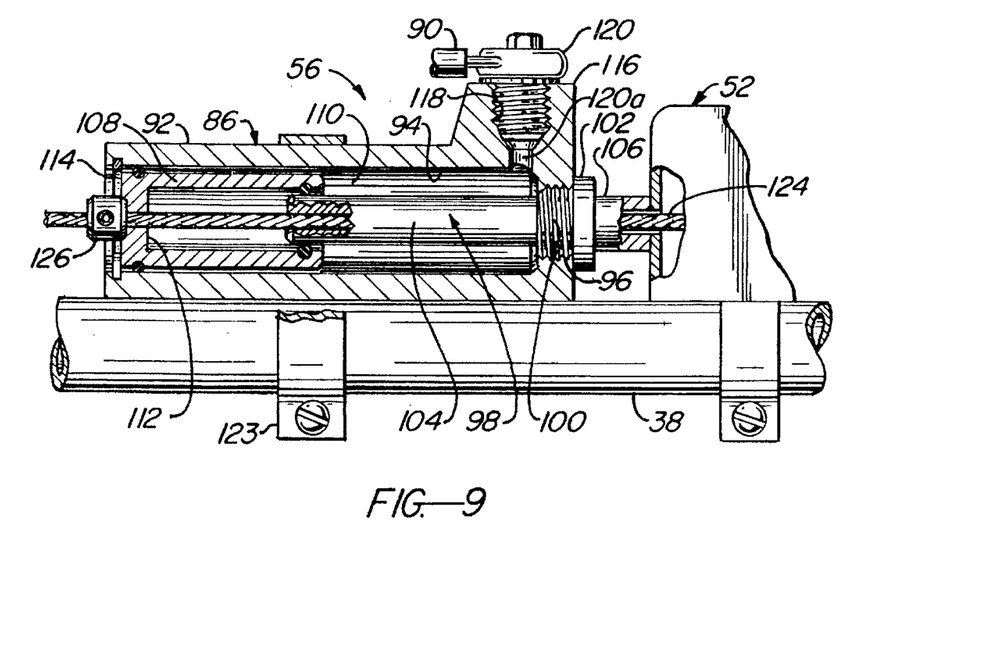
FIG. 9 is an enlarged section taken on line 9—9 in FIG. 7.

As shown best in FIGS. 8 and 9, each hydraulic unit 86, 88 comprises a cylinder 92 containing an axial bore 94 opening through one end of the cylinder. At the other end of the cylinder, referred to as its head end, is a threaded bore 96 coaxial with and opening to the adjacent end of the cylinder bore. Extending coaxially through the bore 94 is a tubular part 98 having a threaded portion 100 threaded in the opening 96 and an enlarged shoulder 102 seating against the outer surface of the adjacent end of the cylinder. Tubular part 98 includes a relatively long inner sleeve portion 104 extending coaxially through the bore 94 and a relatively short outer sleeve portion 106. The inner sleeve portion 104 terminates a distance from the open end of the cylinder 92 and forms with the wall of the bore 94 an annular space about the inner sleeve portion.

Extending through this annular space and slidable on the inner sleeve portion 104 is a cup-shaped piston 108 which is sealed to the sleeve portion and to the surrounding wall of the bore 94 by seal rings 109. This piston, the cylinder 92, and the sleeve portion 104 form an annular hydraulic chamber 110 whose volume is increased and reduced by axial movement of the piston. The end of the piston 108 adjacent the open end of the cylinder is closed by an end wall 112. Movement of the piston toward the open end of the cylinder is limited by a snap-ring stop 114 removably positioned within a circumferential groove in the wall of the bore 94.

Cylinder 92 has a radial boss 116 at its head end containing a threaded bore 118 opening to the head end of the cylinder bore 94 and through the outer end of the boss. Threaded in this bore is a fitting 120 to which one end of the hydraulic tube 90 is attached. This fitting contains a passage 120a forming a port in the cylinder communicating the passage in the tube to the cylinder chamber 110. The cylinder boss 116 also contains a threaded port 121 sealed by a removable plug 122 through which hydraulic fluid may be introduced into the cylinder chamber 110.

As shown best in FIG. 9, the hydraulic input unit 86 of hydraulic connector is mounted on the handlebar 38 just inboard of the shifting actuator 52 and with the head end of the actuator cylinder 92 adjacent the latter actuator. The unit may be attached to the handlebar in any convenient way, as by means of a strap clamp 123. The piston 108 in the input unit is connected to the shifting actuator 52 by a short length of metal cable 124. One end of this cable extends slidably through the tubular part 98 of the input unit 86 and through a hole in the end wall 112 of the piston. Fixed on the outer end of cable 124 by a set screw 125 is a shoulder member 126 engagable with the outer side of the piston end wall 112, whereby endwise movement of the cable to the right in FIG. 9 with the shoulder member 126 in contact with the piston end wall moves the piston 108 to the right in the cylinder 92. Endwise movement of the cable to the left accommodates movement of the piston to the left in the cylinder.

The shifting actuators 52, 54 are conventional actuators of the kind used on many bicycles having conventional derailleur shifting systems which utilize wire cable connectors to connect the actuators to the derailleur shifting mechanisms. Accordingly, it is unnecessary to describe these actuators in elaborate detail. Suffice it to say that each shifting actuator 52, 54 includes a pair of shift levers 128, 130 operable by the rider and an internal cable feed mechanism (not shown) operated by the levers. In a conventional derailleur shifting system, one end of the wire cable of a conventional cable connector is connected to this internal feed mechanism of a shifting actuator. This internal feed mechanism operates to pull the cable into the actuator in increments against the force of the derailleur spring (i.e. spring 76 in FIG. 4) in response to operation of the actuator in a first mode involving alternate depression and release of the actuator shift lever 128 in the manner indicated by the arrows in FIG. 7. Operation of the actuator in a second mode involving alternate depression and release of the actuator shift lever 130 in the manner indicated by the arrows in FIG. 7 releases the cable intermittently for endwise movement of the cable from the actuator in increments by the force of the derailleur spring.

In the present invention, the outer end of the cable 124 of the hydraulic input unit 86 of hydraulic connector 56 extends into the shifting actuator 52, as shown in FIG. 9. The cable 124 is connected to the internal cable feed mechanism in the shifting actuator 52 in the same manner as the wire cable of a conventional wire cable connector, whereby cable 124 is pulled stepwise to the right in FIG. 9 into the actuator and pulls the piston 108 stepwise toward the head end of its cylinder 92 in response to alternate depression and release of the shift lever 128 of the shifting actuator. Alternate depression and release of the shift lever 130 of the shifting actuator 52 releases the cable 124 intermittently for left hand stepwise movement of the cable and piston 108 in FIG. 9.

At this point it should be noted that the cable 124 connecting the hydraulic input unit 86 to the shifting actuator 52 may be provided in either of two ways. For example, the cable 124 may be provided by simply cutting to an appropriate length the end of an existing conventional wire connector cable connected to the shifting actuator. This method may be used to advantage, for example, when retrofitting this invention on a bicycle having a derailleur shifting system connected to a shifting actuator by a conventional wire cable connector. Another way of providing the cable 124 is to provide the hydraulic input unit 86 with a cable of appropriate length for attachment to a shifting actuator which has no cable or from which an existing wire connector cable has been removed.

Figures 4, 5:
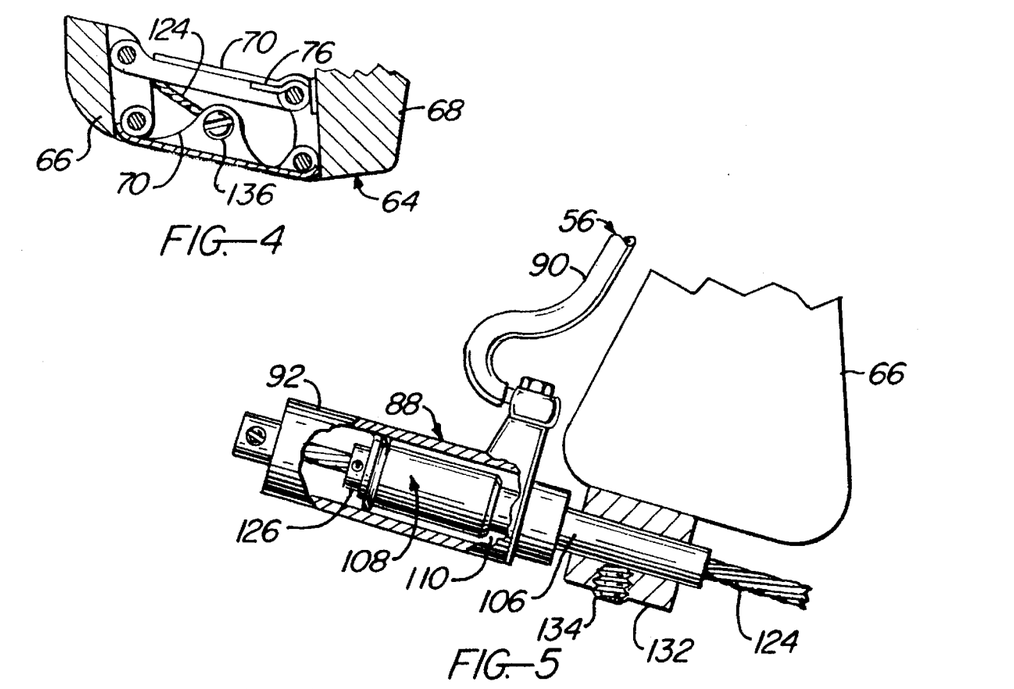
FIG. 4 is an enlarged section taken on line 4—4 in FIG. 2.
FIG. 5 is an enlargement, partially broken away, of the area encircled by the arrow 5—5 in FIG. 2.
Figure 6:
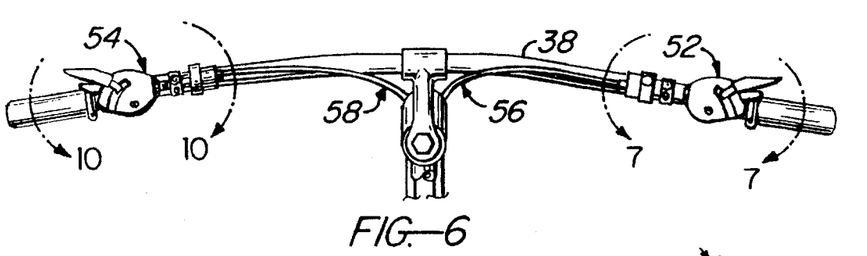
FIG. 6 is an enlarged view looking in the direction of the arrows on line 6—6 in FIG. 1.
Figure 7:
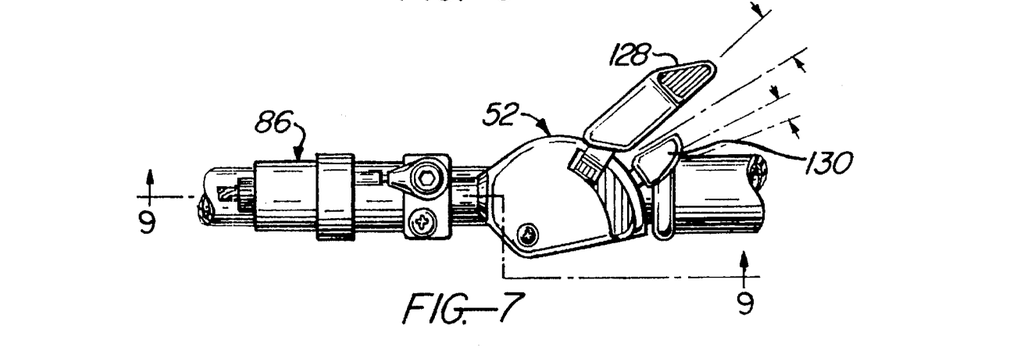
FIG. 7 is an enlargement of the area encircled by the arrow 7—7 in FIG. 6.

As shown best in FIGS. 2 and 5, the cylinder 92 of the hydraulic output unit 88 of hydraulic connector 56 is mounted on the lower end of the parallelogram support arm 66 of the rear derailleur mechanism 44. To this end, the outer sleeve portion 106 of the output unit is slidably positioned within a rigid bushing 132 on the lower end of the parallelogram support arm 66. In the conventional rear derailleur mechanism of U.S. Pat. No. 5,197,927, this bushing receives the lower end of the conventional cable connector. The sleeve portion 106 of the hydraulic output unit 88 is releasably fixed in the bushing 132 by a set screw 134. As shown best in FIG. 2 and 4, the outer end of the cable 124 of the hydraulic output unit 88 is secured to a cable clamp 136 on the outer arm 70 of the rear derailleur parallelogram support 64. The cable extends rearwardly and inwardly from the cable clamp at an acute angle relative to the outer parallelogram arm, as shown in FIG. 4, whereby a left hand endwise force on the cable in FIGS. 2, 4, and 5 tends to pull the parallelogram support 64 and the derailleur sprocket cage 78 inwardly toward the rear wheel 18, axially of the rear sprocket cluster 42 against the outward bias force of the rear derailleur spring 76. The hydraulic shifting structure described above constitutes the hydraulic shifting system 59a.

Turning now to FIGS. 1 and 10-12, it will be recalled that the shifting system 59b comprises a front sprocket cluster 40 rigid on the pedal crank 22, a front shifting mechanism 48 including adjustable shifting means 50, and a hydraulic connector 58 connecting the shifting mechanism 48 to the shifting actuator 54. The front sprocket cluster 40 comprises two sprockets 60 of different diameters rigidly and coaxially mounted on the pedal crank at the same side of the bicycle frame as the rear sprocket cluster 42. The shifting mechanism 48 of the hydraulic shifting system 59b is a derailleur mechanism comprising a parallelogram support 138 including a mounting member 140 rigidly secured to the bicycle frame member 30 a distance above the supporting hub 141 for the crank pedal 22. Pivotally secured at one end to the mounting member 140 are a pair of parallelogram arms 142 which extend toward the front sprocket cluster 40. The outer ends of the arms 142 are pivotally secured to a derailleur cage 144 which straddles the upper run of the sprocket chain 43 close to the front sprocket cluster. The parallelogram support 138 supports the derailleur cage 144 for movement generally axially of the front sprocket cluster 40 to shift the sprocket chain 43 from one sprocket 60 of the front cluster to the other. The parallelogram support 138 includes a derailleur spring (not shown) about one parallel arm pivot, like the derailleur spring 76 in FIG. 4, which urges the derailleur cage 144 inwardly toward the bicycle frame. The parallelogram arms 142 and the cage 144 together constitute the derailleur shifting means 50.

Figure 10:
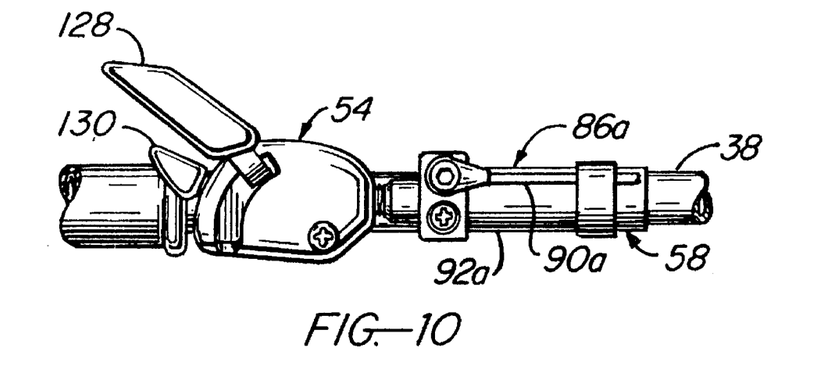
FIG. 10 is an enlargement of the area encircled by the arrow 10—10 in FIG. 6.

The hydraulic connector 58 connects the shifting actuator 54 to the shifting means 50 of the front derailleur mechanism 48. To this end, the hydraulic input unit 86a of the connector 58 is mounted on the bicycle handlebar immediately inboard of the shifting actuator 54 with the head end of its cylinder 92a adjacent the shifting actuator, as shown in FIG. 10. The cable (124a) of the input unit 86a is connected to the shifting actuator 54 in the same manner as the cable 124 of the input unit 86 of the hydraulic connector 56 is connected to the shifting actuator 52 in FIG. 9. The output unit 88a of the hydraulic connector 58 is firmly mounted on the bicycle frame member 30 in the manner illustrated in FIGS. 11 and 12. The cable 124a of the output unit 88a is attached to a cable clamp 146 on the outer end of an extended portion 148 of one arm 142 of the parallelogram support 138, whereby the derailleur spring in this support urges the latter cable, and thereby also the piston within the hydraulic output unit 88a upwardly in FIG. 10, relative to the cylinder 92 of the output unit.

The improved shiftable variable ratio sprocket drive 12 of the invention operates in the following manner. Each hydraulic connector 56, 58 is filled with a volume of hydraulic fluid substantially equal to the displacement volume of one hydraulic unit (86 or 88, 86s or 88a) of the respective connector plus the volume of the passage in the connector hydraulic hose or tube 90, 90a of the respective connector. This displacement volume of each hydraulic unit equals the change in the volume of its hydraulic chamber 110,110a during movement of its piston 108, 108a from one end of its stroke to the other. As noted earlier, the hydraulic connectors have ports 121 for introducing hydraulic fluid into the hydraulic connectors and removable plugs 122 for sealing these ports.

The sprocket chain drive 12 has a normal state in which the sprocket chain 43 engages one sprocket 60 of the front sprocket cluster 40 and one sprocket 62 of the rear sprocket cluster 42 to drivably connect the pedal crank 22 to the rear sprocket cluster 42. In the following description, it is assumed that the sprocket chain 43 initially engages the larger sprocket 60 of the front sprocket cluster 40 and the smallest sprocket 62 of the rear sprocket cluster 42, as shown in the drawings. This illustrated position of the sprocket chain and the illustrated corresponding positions of the other elements of the sprocket chain drive are referred to as their initial positions. Rotation of the crank 22 in a clockwise direction in FIG. 1 now drives the rear wheel 18 in a clockwise direction to propel bicycle forwardly with a drive ratio equal to the ratio of the diameters of the engaged sprockets.

The rear deraileur spring 76 continuously urges the rear derailleur parallelogram support 76 and sprocket cage 78 outwardly away from the rear wheel 18 and thereby exerts a tension force on the cable 124 of the hydraulic output unit 88 of the hydraulic connector 56. This tension force urges the piston 108 of the output unit 88 toward the head end of its cylinder 92 (i.e. to the right in FIG. 5) to displace hydraulic fluid from the hydraulic chamber 110 in the unit through the tube 90 of the hydraulic connector 56 into the hydraulic chamber 110 of the input unit 86 of the connector. The hydraulic fluid urges the piston 108 of the hydraulic input unit to the left in FIG. 9 away from the shifting actuator 52 and against the shoulder 126 on the actuator cable 124. A tension force is thereby exerted on the cable which urges the cable to the left in FIG. 9 away from the shifting actuator 52 and to the position shown wherein the piston 108 in the hydraulic input unit 86 is adjacent or engages its snap ring stop 114.

Until the shift levers 128, 130 of the shifting actuator 52 are actuated (i.e. alternately depressed and released in the manner explained earlier), the cable feed mechanism within this shifting actuator firmly secures the cable 124 and hence the piston 108 of the hydraulic input unit 86 of the hydraulic connector 56 against leftward movement in FIG. 9 by the pressure of the hydraulic fluid displaced from the hydraulic output unit 88 of the connector. In the position of FIG. 9, of course, leftward movement of the piston and cable is also limited by the snap ring stop 114. Under these conditions, the hydraulic fluid within the hydraulic connector 56 hydraulically blocks right hand movement in FIG. 5 of the piston 108 in the output unit 88 of hydraulic connector 56 which right hand movement of the piston may also be blocked by engagement of the piston with the head end of its cylinder 92. The rear derailleur parallelogram support 64 and sprocket cage 78 are thereby restrained against outward movement beyond their positions of FIG. 3 by the force of the rear derailleur spring 76.

The volume of hydraulic fluid within the hydraulic connector 56 and the position of the stop shoulder 126 along the cable 124 of its hydraulic output unit 88 are made such that when the piston 108 of the hydraulic input unit 86 occupies its position of FIG. 9, the stop shoulder 126 positions the piston 108 of the hydraulic output unit 88 at or near the right end of its stroke in FIG. 5. The hydraulic fluid within the hydraulic connector 56 is then pressurized by the rightward force exerted on the output unit piston 108 by the rear derailleur spring 76. The output unit piston is thereby acted on by two opposing forces which are the internal hydraulic fluid pressure force and the external force of the rear derailleur spring 76. These opposing forces retain the rear derailleur sprocket chain cage 78 in its initial position of FIG. 3. The rear derailleur mechanism 44 may also include positive stop means for limiting outward movement of the sprocket cage 78 to its position of FIG. 3. In this position, the sprocket chain 43 engages the smallest sprocket 62 of the rear sprocket cluster 42.

Similarly, the front deraileur spring continuously urges the front derailleur parallelogram support 138 and sprocket chain cage 144 inwardly toward the bicycle frame and thereby exerts a tension force on the cable 124a of the hydraulic output unit 88a of the hydraulic connector 58. This tension force urges the piston (108a) of the output unit 88a in a direction (i.e. upwardly in FIG. 10) to displace hydraulic fluid from the hydraulic chamber (110a) in the unit through the tube 90a of the hydraulic connector 58 into the hydraulic chamber (110a) in the input hydraulic unit 86a of the hydraulic connector 58. This hydraulic fluid urges the piston (108a) in the hydraulic input unit 86a to the right in FIG. 10 away from the shifting actuator 54 and against the shoulder (126a) on its cable (124a). Until the shift levers 128, 130 of the shifting actuator 54a are actuated, the cable feed mechanism within this shifting actuator secures the cable (124a) of the hydraulic input unit 86a and hence its piston (108a) against rightward movement in FIG. 10 by the hydraulic fluid pressure in the hydraulic connector 58.

Figure 11:
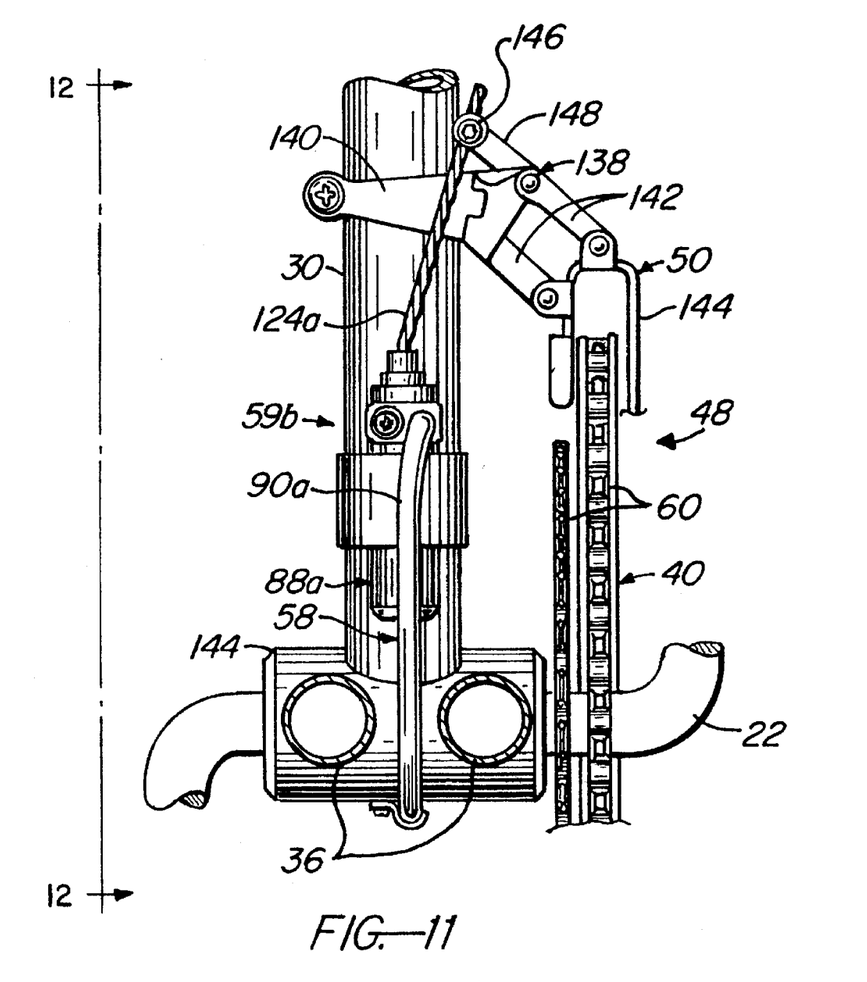
FIG. 11 is an enlarged section taken on line 11—11 in FIG. 1.
Figure 12:
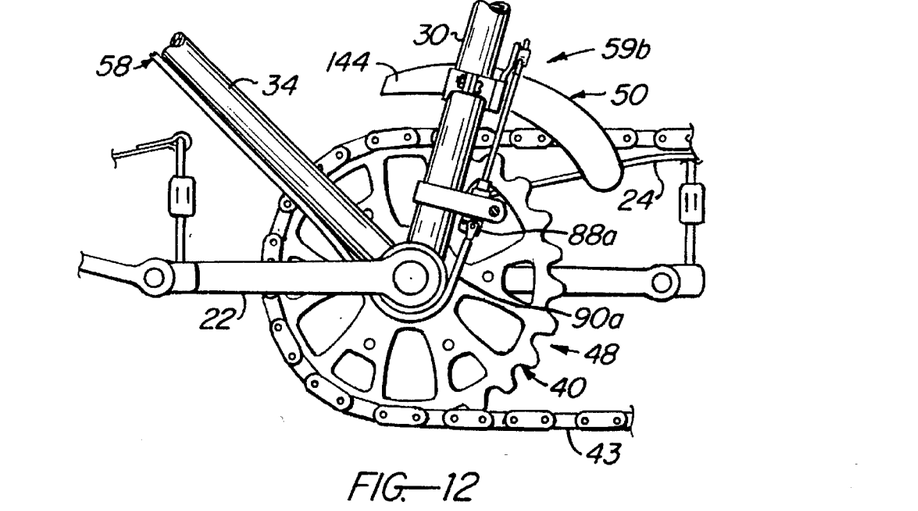
FIG. 12 is a view taken on line 12—12 in FIG. 11.

The volume of hydraulic fluid within the hydraulic connector 58 and the position of the stop shoulder (126a) along the cable 124a of the hydraulic output unit 88a are made such that when the piston (108a) of the hydraulic input unit 86a occupies a position corresponding to that of piston 108 in FIG. 9, the stop shoulder (126a) positions the piston (108a) of the hydraulic output unit 88a at or near the upper end of its stroke in FIGS. 11 and 12. The hydraulic fluid within the hydraulic connector 58 is then pressurized by the force exerted on the output unit piston (108a) by the front derailleur spring, whereby the latter piston (108a) is subjected to two opposing forces, namely internal hydraulic fluid pressure and the external front derailleur spring force. These opposing forces retain the piston of the hydraulic output unit 88a at or near the upper end of its stroke in FIGS. 11 and 12 and retain the front derailleur sprocket chain cage 144 in its position of FIG. 11. In these positions, the front sprocket chain cage 144 engages the sprocket chain 43 with the larger sprocket 60 of the front sprocket cluster 40.

The rear and front derailleur shifting mechanisms 44, 48 are operated or shifted to shift the sprocket chain 43 along the rear and front sprocket clusters 42, 40 from one sprocket to the next and thereby adjust the drive ratio of the sprocket chain drive 12 by selectively actuating, that is alternately depressing and releasing, the shift levers 128, 130 of the shifting actuators 52, 54. Assuming the sprocket chain 43 occupies its initial position shown in the drawings, wherein the chain engages the larger sprocket 60 of the front sprocket cluster 40 and the smallest sprocket 62 of the rear sprocket cluster 42, the chain is shifted to a larger sprocket of the rear sprocket cluster by depressing and releasing the actuating lever 128 of the shifting actuator 54. The chain is shifted to the smaller sprocket 60 of the front sprocket cluster by depressing and releasing the actuating lever 128 of the shifting actuator 54. The sprocket chain is shifted in the opposite directions along the sprocket clusters by depressing and releasing the shift levers 130 of the shifting actuators.

Thus, each depression and release of the shift lever 128 of the shifting actuator 52 operates its internal cable feed mechanism to pull the cable 124 and thereby the piston 108 of the hydraulic input unit 86 of the hydraulic connector 56 to the right in FIG. 9 in increments against the hydraulic fluid pressure created in the hydraulic connector by the rear derailleur spring 76. This incremental movement of the piston to the right in FIG. 9 displaces hydraulic fluid in increments from its hydraulic chamber 110 through the respective hydraulic tube 90 into the hydraulic chamber 110 of the hydraulic output unit 88 of the hydraulic connector 56. The hydraulic fluid entering the latter chamber forces its piston 108 to the left in increments in FIG. 5 and thereby pulls the rear derailleur sprocket cage 78 inwardly in increments along the rear sprocket cluster 42 against the force of the rear derailleur spring 76. This shifts the sprocket chain 43 inwardly from one sprocket 62 of the rear sprocket cluster 42 to the next large sprocket and thereby varies the sprocket chain drive ratio.

Each depression and release of the shift lever 130 of the shifting actuator 52 acts to release the cable 124 and thereby the piston 108 of the hydraulic input unit 86 of the hydraulic connector 56 for incremental movement to the left in FIG. 9 by the hydraulic fluid pressure created in the hydraulic connector 56 by the rear derailleur spring 76. This incremental movement of the piston 108 to the left in FIG. 9 permits additional hydraulic fluid flow into its chamber 110 in increments from the chamber 110 of the hydraulic output unit 88 in FIG. 5. The piston 108 in the output unit 88 is thereby released for incremental movement to the right in FIG. 5, whereby the rear derailleur spring 76 moves the rear derailleur sprocket cage 78 inwardly an incremental distance along the rear sprocket cluster 42 to shift the sprocket chain 43 from one sprocket 62 to the next larger sprocket of the cluster.

At this point, it is important to note that the internal cable feed mechanism of the conventional shifting actuator 52 is so constructed and arranged that each full depression and release of the actuating lever 128 of the actuator pulls or advances the cable 124 of the hydraulic input unit 86 a certain fixed distance to the right in FIG. 9. This distance equals the distance the shifting actuator would advance a conventional wire cable connector of the kind referred to earlier. It is evident from the description to this point that each such advance of the cable effects, by hydraulic action, an equal movement of the cable 124 of the hydraulic output unit 88 to the left in FIG. 5. Similarly, each full depression and release of the actuating lever 130 of the conventional shifting actuator 52 releases the cable 124 of the hydraulic input unit 86 and hence also its piston 108 for movement the same fixed distance to the left in FIG. 9 by the hydraulic fluid pressure produced in the hydraulic connector 56 by the rear derailleur spring 76. This latter distance equals the distance a conventional wire cable would move when connected to and intermittently released by the shifting actuator.

It is evident, therefore, that each such intermittent release of the cable 124 of the hydraulic input unit 86 effects intermittent release by hydraulic action of the cable 124 of the hydraulic output unit 88 of hydraulic connector 56 for movement of the latter cable through the same distance to the right in FIG. 5. Accordingly, the present rear derailleur shifting system 59a is operative to shift the sprocket chain 43 inwardly and outwardly and from one sprocket 62 to the next along the rear sprocket cluster 42 in the manner described.

Similarly, actuation of the shift levers 128, 130 of the shifting actuator 54 hydraulically operates the front derailleur shifting system 59b to shift the sprocket chain 43 back and forth between the two sprockets 60 of the front sprocket cluster 40 in essentially the same way as described above in connection with the shifting actuator 52. It will be understood, of course, that the rear derailleur shifting actuator 52 may be operated to shift the sprocket chain 43 a number of times in succession in the same direction, for example to engage the sprocket chain with the several rear sprockets 62 in succession. In contrast, the shifting actuator 54 is operated to shift the sprocket chain back and forth between the two front sprockets in alternate sequence.

Figure 13:
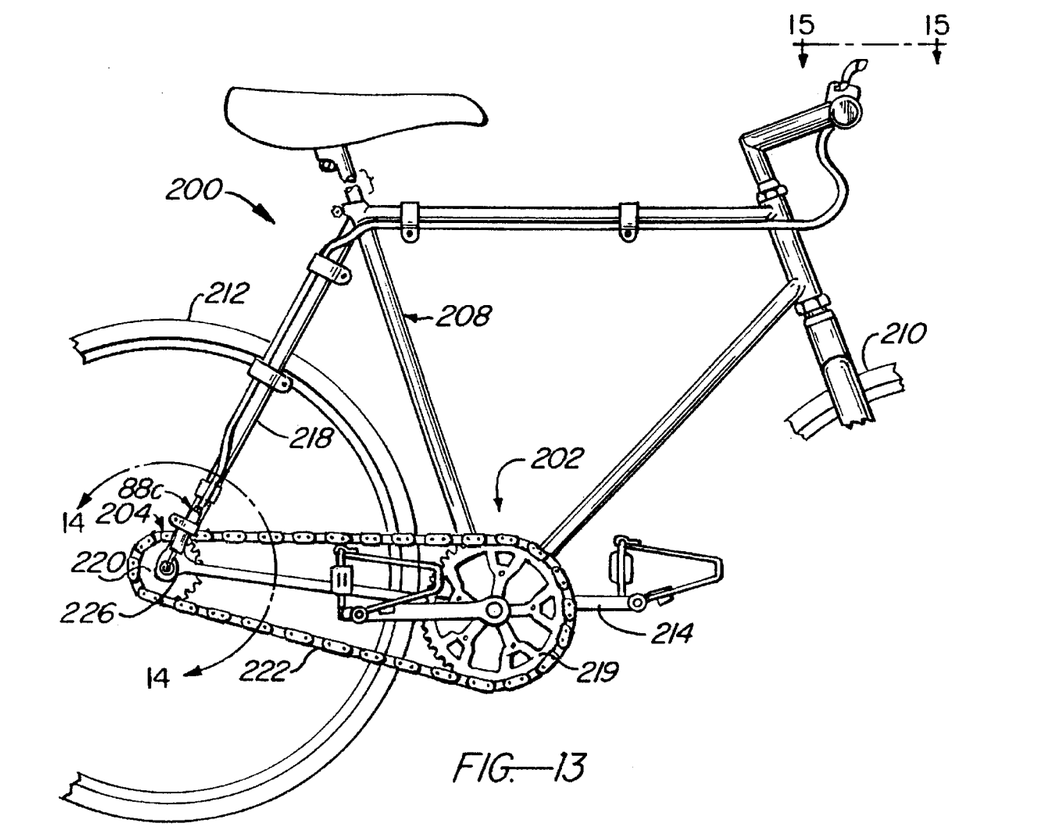
FIG. 13 is a view similar to FIG. 1 of a bicycle, having a sprocket chain drive including a Sachs shifting system according to this invention.
Figure 14:
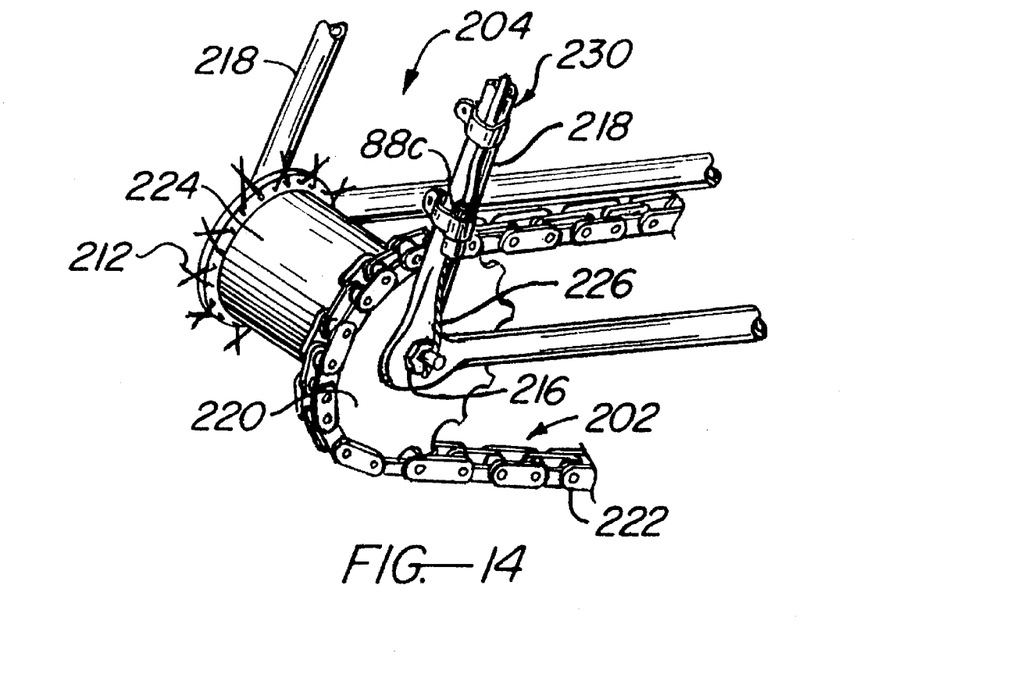
FIG. 14 is perspective view of the area encircled by the arrow 14—14 in FIG. 13.
Figure 15:
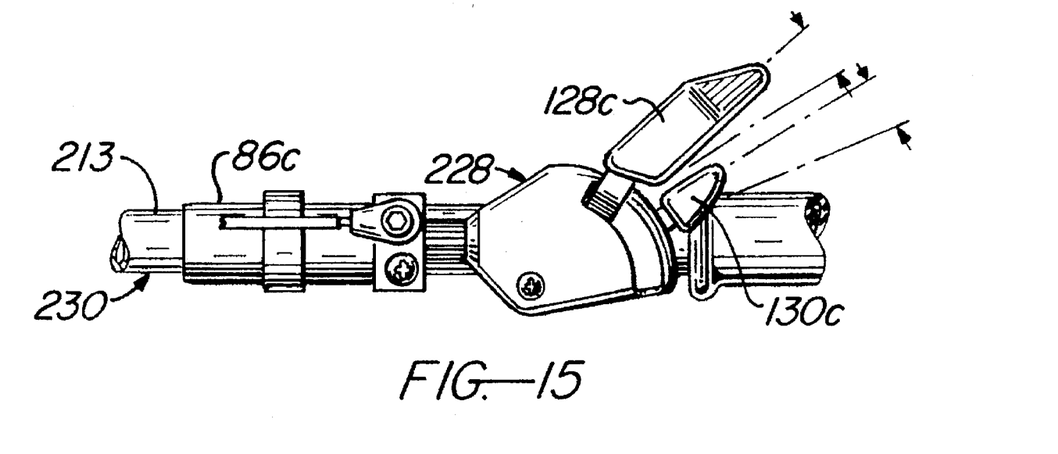
FIG. 15 is an enlarged view taken on line 15—15 in FIG. 13.

Turning now to FIGS. 13–15, there is illustrated a bicycle 200 having a shiftable variable ratio sprocket chain drive 202 including a gear shifting mechanism 204 and an hydraulic shifting system 206 according to this invention for operating the shifting mechanism. Again, except for the hydraulic shifting system 206 embodied in the sprocket chain drive 202, the bicycle 200 is conventional and hence need be described only in sufficient detail to provide a clear and complete understanding of this invention. With this in mind, the bicycle includes a frame 208 mounting front and rear wheels 210, 212, a handlebar 213, and a rotary pedal crank 214. The rear wheel 212 is mounted on an axle 216 supported at its end on the rear fork 218 of the bicycle frame 208. The sprocket chain drive 202 comprises a front sprocket 219 rigid on the pedal crank 214, a rear sprocket 220 mounted on the axle 214 and drivably coupled to the rear wheel 212 by the gear shifting mechanism 204, and a sprocket chain 222 trained about and engaging the front and rear sprockets. Clockwise rotation of the pedal crank 214 in the drawings drives the rear wheel in clockwise rotation through the gear shifting mechanism 204 to propel the bicycle forwardly.

The shifting mechanism 204 comprises a gear mechanism (not shown) within the hub 224 of the rear wheel 212 and embodies an adjustable shifting means including a shifter chain 226 extending externally of the wheel hub through an axial bore in the rear wheel axle 216, as shown best in FIG. 14. This shifter chain is pullable outwardly through the axle against the force of a spring within the hub to change the drive ratio of the mechanism in one direction. The shifter chain is returnable inwardly through the axle by spring action to change the drive ratio in the opposite direction. Mounted on the bicycle handlebar 213 is a shifting actuator 228 connected to the shifter chain 226 by a hydraulic connector 230 according to this invention.

The shifting actuator 228 is identical to the shifting actuators 52, 54 described earlier. The hydraulic connector 230 is identical to the hydraulic connectors 56, 58 described earlier. Accordingly, it is unnecessary to redescribe the shifting actuator 228 and the hydraulic connector 230. Also, those parts of the actuator and connector which are referred to below are designated by the same reference numerals, with the subscript "c", as the corresponding parts of the shifting actuators 52, 54 and hydraulic connectors 56, 58.

The reference numerals relating to those actuator and connector parts which are not visible in FIGS. 13–15 are enclosed in parenthesis.

The hydraulic input unit 86c of the hydraulic connector 230 is mounted on the handlebar 213 close to the shifting actuator 228. The input piston (108c) of the input unit 86c is connected to the actuator in the exactly the same manner as the input piston 108 is connected to the shifting actuator 52 in FIG. 9. The hydraulic output unit 88c of the hydraulic connector 230 is mounted on the rear frame fork 218 just above the end of the rear wheel axle 216 from which the Sachs shifter chain 226 extends. The output piston (108c) in the output unit 88c is connected to the outer end of the shifter chain, as shown in FIG. 14.

The operation of the shifting variable ratio sprocket chain drive 202 is obvious from the foregoing description. Thus, operation of the shift lever 128c of the shifting actuator 228 moves the input piston (108c) of the hydraulic connector 230 in a direction (i.e. to the right in FIG. 15) to displace hydraulic fluid from the hydraulic input unit 86c of the hydraulic connector 230 to the hydraulic output unit 88c of the connector. The hydraulic fluid entering the output unit 88c moves its output piston (108c) in a direction (i.e. upwardly in FIG. 13 and rightward in FIG. 14) to pull the Sachs shifter chain 226 outwardly and thereby change the drive ratio of the gear shifting mechanism 204 in one direction. Operation of the shift lever 130c of the shifting actuator 228 releases the input piston (108c) of the hydraulic connector 230 for movement in the opposite direction (i.e. to the left in FIG. 15) by the pressure of the hydraulic fluid created by the inward spring force on the shifter chain 226. This spring force then pulls the output piston (108c) of the output unit 88c of the hydraulic connector 20 in a direction (i.e. downwardly in FIG. 13 and leftward in FIG. 14) and pulls the shifter chain 226 inwardly through the rear wheel axle 216 to change the drive ratio of the gear shifting mechanism 204 in the opposite direction.

The inventor claims:

1. A rider propelled vehicle comprising:

a vehicular device comprising a frame, wheels including a driven wheel rotatably mounted on said frame, a crank rotatably mounted on said frame and adapted to be driven in rotation by a rider, shiftable variable ratio sprocket chain drive means drivably connecting said crank and said driven wheel in a manner such that rotation of said crank in one direction drives said driven wheel in rotation with a drive ratio equal to the number of revolutions of said crank per revolution of said driven wheel and in a direction to propel the vehicle forwardly, and an hydraulic shifting system operable by the rider for hydraulically shifting said drive means to change said drive ratio, and wherein said hydraulic shifting system comprises a shifting actuator mounted on said vehicular device for operation by the rider in drive-ratio-increasing and drive-ratio-reducing modes, a drive ratio adjusting mechanism adjustable in a first adjustment direction to increase said drive ratio and in a second adjustment direction to reduce said drive ratio, a spring connected to said mechanism for urging said mechanism in one adjustment direction, a hydraulic connector extending between said actuator and said mechanism, and connecting means connecting said hydraulic connector to said actuator and said mechanism for effecting hydraulic adjustment of said mechanism in its first adjustment direction to increase said drive ratio in response to operation of said actuator in its drive-ratio-increasing mode and hydraulic adjustment of said mechanism in its second adjustment direction to reduce said drive ratio in response to operation of said actuator in its drive-ratio-reducing mode, said hydraulic connector comprises (a) an hydraulic input unit including an input cylinder containing an axial bore closed at one end by a cylinder end wall, a tubular sleeve extending coaxially through said bore from said end wall and radially spaced from the wall of said bore to form an annular input chamber between said bore wall and said sleeve, a fluid port opening to said chamber, and a cup-shaped input piston slidable in said bore and on said sleeve and movable axially through said input chamber in a first direction to displace hydraulic fluid from said chamber through said port and movable in a second direction by fluid pressure in said chamber, (b) an hydraulic output unit including an output cylinder containing an axial bore closed at one end by an output cylinder end wall, a tubular output cylinder sleeve extending coaxially through said output cylinder bore from said output cylinder end wall and radially spaced from the wall of said output cylinder bore to form an annular output chamber between said output cylinder bore wall and said output cylinder sleeve, a fluid port opening to said output chamber, and a cup-shaped output piston slidable in said output cylinder bore and on said output cylinder sleeve and movable axially through said output chamber in a first direction to displace hydraulic fluid from said output chamber through said output chamber port and in a second direction by fluid pressure in said output chamber, and (c) a hydraulic tube connecting said ports for conducting hydraulic fluid between said chambers, and said connecting means comprises a first cable extending slidably through said input cylinder sleeve and connecting said input piston and said actuator and a second cable extending slidably through said output cylinder sleeve and connecting said output piston and said drive ratio adjusting mechanism in a manner such that (a) operation of said actuator in one mode moves said input piston in its first direction to displace hydraulic fluid from said input chamber to said output chamber, whereby the hydraulic fluid entering said output chamber moves said output piston in its second direction and thereby moves said drive ratio adjusting mechanism in its other adjustment direction against the force of said spring to change said drive ratio in one direction, and (b) operation of said actuator in its other mode effects movement of input piston in its second direction, movement of said output piston in its first direction, and adjustment of said mechanism in its said one adjustment direction by the force of said spring to change said drive ratio in the other direction and displace hydraulic fluid from said output chamber to said input chamber.

2. A rider propelled vehicle comprising:

a vehicular device comprising a frame, wheels including a driven wheel rotatably mounted on said frame, a crank rotatably mounted on said frame and adapted to be driven in rotation by a rider, shiftable variable ratio sprocket chain drive means drivably connecting said crank and said driven wheel in a manner such that rotation of said crank in one direction drives said driven wheel in rotation with a drive ratio equal to the number of revolutions of said crank per revolution of said driven wheel and in a direction to propel the vehicle forwardly, and an hydraulic shifting system operable by the rider for hydraulically shifting said drive means to change said drive ratio, and wherein said hydraulic shifting system comprises a shifting actuator mounted on said vehicular device for operation by the rider in drive-ratio-increasing and drive-ratio-reducing modes, a drive ratio adjusting mechanism adjustable in a first adjustment direction to increase said drive ratio and in a second adjustment direction to reduce said drive ratio, and drive ratio adjusting means connected to said mechanism including a hydraulic connector extending between said actuator and said mechanism and connecting means connecting said hydraulic connector to said actuator and said mechanism for effecting hydraulic adjustment of said mechanism in its first adjustment direction through said hydraulic connector to increase said drive ratio in response to operation of said actuator in its drive-ratio-increasing mode and hydraulic adjustment of said mechanism in its second adjustment direction through said hydraulic connector to reduce said drive ratio in response to operation of said actuator in its drive-ratio-reducing mode, and said connecting means includes means for effecting connection of said hydraulic connector to said actuator and said drive ratio adjusting mechanism at any time including after mounting of said actuator and said mechanism on said vehicular device.

3. A rider propelled vehicle according to claim 2 wherein:

said hydraulic connector is adapted to contain hydraulic fluid and includes movable input and output members which are hydraulically coupled by hydraulic fluid in the connector for movement of said output member in response to movement of said input member, said connecting means comprise an input connection joining said input member and said actuator for effecting movement of said input member in response to operation of said actuator by the rider and an output connection joining said output member and said drive ratio adjusting mechanism for effecting adjustment of said mechanism in response to movement of said output member, and said means for effecting connection of said hydraulic connector to said actuator and said drive ratio adjusting mechanism at any time including after mounting of said actuator and said mechanism on said vehicular device comprise means for selectively releasing and securing said input and output connections.

4. A rider propelled vehicle according to claim 2 wherein:

said drive ratio adjusting means includes a spring which urges said drive ratio adjusting mechanism in one adjustment direction, and said hydraulic connector hydraulically urges said mechanism in its other adjustment direction against the force of said spring in response to operation of said actuator in one mode, and said hydraulic connector effects adjustment of said mechanism in its other adjustment direction by the force of said spring in response to operation of said actuator in its other mode.

5. A rider propelled vehicle according to claim 2 wherein:

said hydraulic connector comprises (a) an hydraulic input unit including an hydraulic input chamber, a fluid port opening to said chamber, and a movable input member movable in a first direction to displace hydraulic fluid from said chamber through said port and movable in a second direction by fluid pressure in said chamber, (b) an hydraulic output unit including an hydraulic output chamber, a fluid port opening to said output chamber, and a movable output member movable in a first direction to displace hydraulic fluid from said output chamber through said output chamber port and in a second direction by fluid pressure in said output chamber, and (c) a hydraulic tube connecting said ports for conducting hydraulic fluid between said chambers, said connecting means comprise an input connection joining said input member and said actuator and an output connection joining said output member and said drive ratio adjusting mechanism in a manner such that operation of said actuator in one mode moves said input member in its first direction through said input connection to displace hydraulic fluid from said input chamber to said output chamber, whereby the hydraulic fluid entering said output chamber moves said output member in its second direction and thereby moves said mechanism in one adjustment direction through said output connection to change said drive ratio in one direction, said drive ratio adjusting means includes means whereby operation of said shifting actuator in its other mode effects movement of said output member in its second direction and thereby adjustment of said drive ratio adjusting mechanism in its other adjustment direction to change said drive ratio in the other direction and displace hydraulic fluid from said output chamber to said input chamber, and said means for effecting connection of said hydraulic connector to said actuator and said drive ratio adjusting mechanism at any time including after mounting of said actuator and said mechanism on said vehicular device comprise means for selectively releasing and securing said input and output connections.

6. A rider propelled vehicle according to claim 5 wherein:

said input member comprises an input piston movable in said input chamber, said output member comprises an output piston movable in said output chamber, said input connection comprises an input connecting member joining said actuator and said input piston, and said output connection comprises an output connecting member joining said output piston and drive ratio adjusting mechanism, and said means for selectively releasing and securing said input and output connections comprise means releasably securing said input and output connecting members to said input and output pistons, respectively.

7. A rider propelled vehicle according to claim 5 wherein:

said input unit comprises an input cylinder containing an axial bore closed at one end by a cylinder end wall, and a tubular sleeve extending coaxially through said bore from said end wall and radially spaced from the wall of said bore to form between said bore wall and said sleeve an annular space which constitutes said input chamber, said input member comprises a cup-shaped input piston slidable in said bore and on said sleeve and movable axially through said input chamber, and said input connection comprises an input connecting member extending slidably through said sleeve and joining said piston and said actuator, said output unit comprises an output cylinder containing an axial bore closed at one end by a cylinder end wall, and a tubular sleeve extending coaxially through said output cylinder bore from said output cylinder end wall and radially spaced from the wall of said output cylinder bore to form between said output cylinder bore wall and said output cylinder sleeve an annular space which constitutes said output chamber, said output member comprises a cup-shaped output piston slidable in said output cylinder bore and on said output cylinder sleeve and movable axially through said output chamber, and said output connection comprises an output connecting member extending slidably through said output cylinder sleeve and joining said output piston and said drive ratio adjusting mechanism, and said means for selectively releasing and securing said input and output connections comprise means releasably securing said input and output connecting members to said input and output pistons, respectively.

8. A rider propelled vehicle according to claim 7 wherein:

said input and output connecting members comprise wire cables.

9. A rider propelled vehicle according to claim 1 wherein:

said vehicular device is a bicycle.

* * * * *